3,352,937
COMPOUNDS DERIVED FROM ALLYL-ADDITION
OF OLEFINS TO ACETYLENE
Paolo Chini, Milan, and Martino Dolci and Marcello de
Maldè, San Donato Milanese, Italy, assignors to SNAM
S.p.A., Milan, Italy, a company of the Italian Republic
No Drawing. Filed May 26, 1964, Ser. No. 370,337
Claims priority, application Italy, Aug. 1, 1963,
16,001/63, Patent 702,588
9 Claims. (Cl. 260—680)

ABSTRACT OF THE DISCLOSURE

An allyl addition of an olefin to acetylene is effected in a glass-lined reaction vessel, thereby increasing the yield of non-conjugated diene compound. In the case of reaction between acetylene and propylene the compound produced is pentadiene-1,4 in detectable (0.2%) amount. Better results are obtained with isobutylene, giving 6.5% concentration of 2-methylpentadiene-1,4 after 2.5 hours at 6–10 atm. and 370° C.

---

The present invention relates to the allyl-addition of olefins to acetylene according to the following reaction pattern:

$$R_1-\underset{R_5}{\underset{|}{C}}H-\underset{}{\overset{R_3}{\underset{|}{C}}}=\overset{R_4}{\underset{|}{C}} + HC\equiv CH \longrightarrow R_1-\underset{R_5}{\underset{|}{C}}=\overset{R_3}{\underset{|}{C}}-\overset{R_4}{\underset{|}{C}}-CH=CH_2$$

The allyl-addition of olefins to acetylene is not described in the technical literature and it could have been surmised that unsubstituted acetylene itself might not be reactive enough.

We have surprisingly ascertained that if the reaction of the olefin compound with acetylene is carried out in a vessel made of glass or other suitable material, it is possible, even at ambient pressures, to obtain detectable amounts of a non-conjugated diene compound.

Moreover, said diene compound has a structure which is in complete agreement with the above noted equation and in the case of the reaction between acetylene and propylene, it corresponds to pentadiene-1,4.

Thus the subject-matter of the present invention is a process for obtaining allyl-addition products of olefins to acetylene characterized in that the reagents come into contact at suitable temperatures and pressure over a surface of a suitable material. The preferred materials comprise glass and superficially vitrified steel.

It is possible to employ several kinds of glass. Good results have been obtained with a boro-silicate glass of the kind called "Pyrex." The glass surface may be treated by chlorosilanes to increase its chemical inertness.

Should it not be possible to employ such materials, the surfaces of the following metals and their alloys are preferable: magnesium, beryllium, zinc, boron, aluminum, carbon, silicon, tin and lead.

Ni-Cr 18/8 stainless steel is not advisable since in this case side-reactions may take place which are likely to cause the diene compound to disappear completely.

This is shown by the following table:

ALLYL-ADDITION OF ISOBUTYLENE TO ACETYLENE

Molar ratio acetylene to isobutylene=0.864.
Temperature: 370° C., Atmospheric pressure.

| Reactor filling mass | Percent of 2-methylpentadiene-1,4 in the reaction product after various reaction times (minutes) | | |
|---|---|---|---|
| | 60 | 100 | 180 |
| Glass Raschig rings [1] | 1.91 | 2.77 | 4.08 |
| Stainless-steel slugs [1] | 1.01 | 1.45 | 2.34 |
| Stainless-steel shavings | 0 | 0 | |

[1] Equal exposed area.

Although according to the present invention the allyl-addition of an olefin to acetylene can be carried out at atmospheric pressure it has been ascertained that by working under greater pressure much better results are obtained. Conversions are more favorable with pressure increase. The upper limit to which pressure can be raised depends upon the apparatus which is being used. Under pressures of the order of magnitude of 10–200 atmospheres, satisfactory results are obtained.

The effect of pressure is illustrated by the data tabulated below:

ALLYL-ADDITION OF ISOBUTYLENE TO ACETYLENE

Molar ratio acetylene to isobutylene: 1.32.
Temperature: 370° C. "Pyrex" glass reactor.

| Pressure atmospheres | Percent of 2-methylpentadiene-1,4 in the reaction product after various reaction times (minutes) | | | Percent yield after 100 mins. |
|---|---|---|---|---|
| | 60 | 100 | 230 | |
| 1 | 1.03 | 1.65 | 2.85 | 36 |
| 2 | 1.58 | 2.01 | 3.48 | |
| 10 | 4.46 | 5.89 | | 31 |

The reaction velocity is a function not only of the total pressure of the mixture but also of the composition of the mixture itself.

With a molar ratio of 1 (one) of the acetylene compound to the olefin compound, there is a maximum velocity, as is evidenced by the data tabulated below:

ALLYL-ADDITION OF ISOBUTYLENE TO ACETYLENE

Tests performed in a "Pyrex" glass reactor at 370° C. and at atmospheric pressure

| Percent acetylene in the reaction mixture | Percent 2-methylpentadiene-1,4 in the reaction product after various reaction times | | |
|---|---|---|---|
| | 100 mins. | 140 mins. | 230 mins. |
| 27.7 | 1.19 | 1.48 | 1.89 |
| 56.8 | 1.65 | 1.94 | 2.85 |
| 72.8 | 1.17 | 1.38 | 1.92 |

Various side-reactions can take place in the reaction system, which are principally a function of the presence of alkaline or acidic substances. Whereas the presence of acidic substances gives rise to the well known polymerization of the olefin compound, the presence of alkaline substances encourages the condensation of acetylene into vinyl-acetylene and benzene. The reaction is also strongly influenced by temperature. In general, it is possible to work within the temperature range 200° C.–500° C.

Between 300° C. and 400° C., both the conversion ratios and the yields are increased, as the temperature is increased.

By way of example, the data are tabulated below:

ALLYL-ADDITION OF ISOBUTYLENE TO ACETYLENE

Molar ratio of acetylene to isobutylene: 0.384, atmospheric pressure, "Pyrex" glass reactor

| Temperature, °C. | Percent 2-methylpentadiene-1,4 in the reaction product after various reaction times | |
|---|---|---|
| | 60 mins. | 180 mins. |
| 320 | 0.094 | 0.187 |
| 350 | 0.45 | 0.70 |
| 370 | 0.9 | 1.89 |

The olefin compounds which can be employed in the present invention are, in general, all the olefin substances in which a hydrogen atom is present in an allyl configuration with respect to a double bond.

Such olefin compounds can also contain other functional groups such as halogen atoms, hydroxyl groups, esterified carboxyl groups etc.

Examples of these compounds are: Propylene, butene-2, isobutylene, 2-methylpentene-1, 2-ethyl-hexene-1, hexene-1, cyclohexene, methallyl chloride, allyl alcohol, methyl crotonate etc. The reactivity of these compounds is widely different from one to another but in general the most reactive are the compounds exhibiting a vinylidene structure.

The allyl-addition reaction can be carried out both in the gaseous phase and in the liquid one. In the latter case it is possible to work either by employing a suitable solvent, or, whenever practicable, by employing the olefin compound in the liquid condition. In general, the presence of a solvent gives rise to a diminished reaction velocity. The reaction can be carried out as a batch-process but is preferably performed as a continuous-run process.

The separation and recovery of the reaction product is effected with the conventional condensation and distillation techniques. The unreacted materials are preferably recycled into the condensation reactor.

The diene compounds prepared in accordance with the present invention are very useful and find many applications. For example, they can be converted either into diols or bicarboxylic acids through oxo-synthesis, or they can be employed as third monomers in the preparation of ethylene-propylene copolymers and as co-monomers in the preparation of curable butyl rubber.

The following examples are merely illustrative and do not imply any limitation.

EXAMPLE 1

A "Pyrex" glass reactor equipped with suitable metallic flanges and connected to a pressure gauge and a needle valve is evacuated by means of a high-vacuum pump, after which it is filled with a gaseous mixture of acetylene (32.39%), isobutylene (61.58%) and isobutene (6.02%) up to a pressure of about 4 atmospheres. During 30 mins., by means of a tubular oven, the temperature is caused to rise to 370° C. so that the pressure goes up to 10 atmospheres. The reaction mixture is sampled from time to time and gas-chromatographic analyses are carried out by utilizing isobutane as the internal standard. The following results are obtained:

| Times, mins. | Percent concn. of 2-methyl pentadiene-1,4 | Percent Yield of 2-methylpentadiene-1,4 with respect to— | |
|---|---|---|---|
| | | HC≡CH | CH₂=C—(CH₃)₂ |
| 50 | 4.2 | 31 | 40 |
| 90 | 4.7 | 20 | 25 |
| 120 | 5.4 | 17 | 21 |
| 150 | 6.5 | 20 | 28 |

At the conclusion of the reaction, the reactor is cooled until all the isobutylene is liquefied, and the liquid product is subjected to rectification: 2-methylpentadiene-1,4 is obtained at 58° C.

EXAMPLE 2

An apparatus identical to that of Example 1 is employed but a mixture consisting of 43.07% propylene, 56.07% acetylene and 0.85% n-hexane is used. At 370° C. the pressure rises to 10 atmospheres. After one hour at that temperature the reaction mixture contains 0.19% of pentadiene-1,4.

What we claim is:

1. A process for the preparation of non-conjugated dienes by allyl-addition to acetylene of olefins having the general formula:

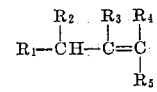

wherein $R_1$, $R_2$, $R_3$, $R_4$, and $R_5$ are selected from the group consisting of hydrogen, alkyl, aryl, cycloalkyl, halogen, hydroxyl, and esterified carboxyl, the reaction being carried out at a temperature between 200° C. and 500° C. within a reaction vessel, in which the surface, which is in contact with the reagents, is of a material selected from: glass and from materials jacketed in the reaction zone with glass.

2. A process according to claim 1, wherein the reaction temperature is between 300° C. and 450° C., and the molar ratio of the olefin to acetylene is between 0.5 and 4.

3. A process according to claim 1, wherein the reaction is carried out at a pressure higher than atmospheric pressure.

4. A process according to claim 1, wherein the molar ratio of olefin to acetylene is between 0.1 and 10.

5. A process according to claim 1, wherein the olefin employed is propylene.

6. A process according to claim 1, wherein the olefin employed is isobutylene.

7. A process according to claim 1, which is performed in the presence of diluents selected from the group of the aliphatic or aromatic hydrocarbons.

8. A process according to claim 1, wherein the reaction takes place in the gaseous phase.

9. A process according to claim 1, wherein the reaction is carried out continuously by recycling to the reaction zone the excess reagents.

References Cited

UNITED STATES PATENTS 1,436,819  11/1922  Plauson _____ 260—680

OTHER REFERENCES

Sauer and Sausen, "Allylic Addition of Olefins to Activated Acetylenes," J. Org. Chem. 27(8) 2730–2 (1962).

P. Chini, M. Dolci, and M. De Malde, "Allylic Addition of Isobutylene to Acetylene," Chim. Ind. (Milan) 46 (10) 1190–11 (October 1964).

PAUL M. COUGHLAN, JR., Primary Examiner.

DELBERT E. GANTZ, Examiner.

C. E. SCHMITKONS, Assistant Examiner.